H. ROBINSON.
ARTIFICIAL MINNOW.
APPLICATION FILED JULY 22, 1918.

1,300,488.

Patented Apr. 15, 1919.

Witness

Inventor
H. Robinson
By
Attorney

UNITED STATES PATENT OFFICE.

HERSCHEL ROBINSON, OF POCAHONTAS, MISSISSIPPI.

ARTIFICIAL MINNOW.

1,300,488.

Specification of Letters Patent.   Patented Apr. 15, 1919.

Application filed July 22, 1918.   Serial No. 246,242.

*To all whom it may concern:*

Be it known that I, HERSCHEL ROBINSON, a citizen of United States, residing at Pocahontas, in the county of Hinds, State of Mississipi, have invented certain new and useful Improvements in Artificial Minnows; and I do hereby declare the following to be a full, clear, and exact description of the invention, such as will enable others skilled in the art to which it appertains to make and use the same.

The invention relates to an artificial bait and more particularly to the class of animated metallic minnows.

The primary object of the invention is the provision of a bait or minnow of this character, wherein the same will wiggle when being drawn through water so as to imitate a live minnow, thereby giving life-like motion to the same, the bait or minnow described being used in angling or catching all kinds of game fish.

Another object of the invention, is the provision of a bait or minnow of this character, wherein the body is in two sections, flexibly or loosely connected together so as to assure life-like motion when submerged in a body of water and being drawn therethrough, a connection between the sections being designed to permit the detachable mounting of hooks, or the adjustment thereof.

A further object of the invention, is the provision of a bait or minnow of this character, which is extremely simple in construction, thoroughly reliable and efficient in its operation and purpose, strong, durable and inexpensive to manufacture.

With these and other objects in view, the invention consists in the features in construction, combination and arrangement of parts as will be hereinafter fully described, illustrated in the accompanying drawing and pointed out in the claims hereunto appended.

In the accompanying drawing.

Similar reference characters indicate corresponding parts throughout the several views in the drawing.

Figure 1:
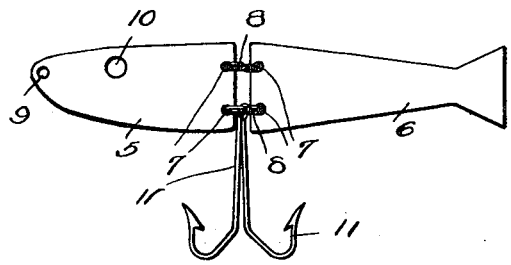
Figure 1, is a side elevation of the bait or minnow constructed in accordance with the invention.
Figure 2:
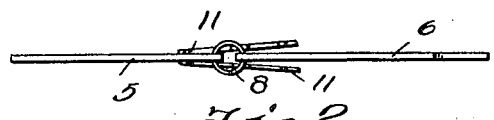
Fig. 2, is a top edge view thereof.
Figure 3:
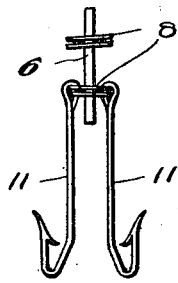
Fig. 3, is a rear end elevation of the forward section of the body of the minnow and showing the rings that pivotally connect it with the rear section and to which the hooks are removably engaged, the hooks being also shown.
Figure 4:
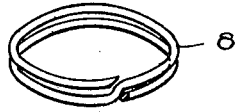
Fig. 4, is a perspective view of one of the connecting rings.

Referring to the drawing in detail, the bait or minnow comprises, preferably two sections, 5 and 6, each preferably made from sheet metal and these two sections are cut to simulate the shape of a live minnow. The inner ends of the sections 5 and 6, are formed with holes 7, in which are engaged split resilient rings 8, thereby flexibly connecting the sections to each other, so that the rear section 6, will wiggle when the bait or minnow is being drawn through a body of water and thus accurately adjust itself when in the water to imitate a live minnow.

At the nose end of the section 5, is formed a hole 9, to which is connected a fishing line of any well known construction, while spaced from the nose end near the top edge of the section 5, is an opening 10, which is of greater size than the openings 7 and 9, and is designed to imitate the eye of a live minnow.

Detachably engaged with the lowermost ring 8, near the bottom edges of the sections 5 and 6, and on opposite sides of the latter, are either triple, double or single hooks 11, which are adapted to depend therefrom and on which is engaged the bait to be nibbled by the fish. The disposition of the hooks 11, prevents the turning over of the bait or minnow and causes the same to ride in the water with the back up, while the flexibly connected sections 5 and 6, will swing or move laterally in the water to simulate life. The split rings 8, will permit easy and ready detachable mounting and the adjustment of the hooks 11, on the artificial bait or minnow. The hooks when carrying the bait for the fish will preclude the possibility of the artificial bait or minnow from turning and avoid any tendency to twist the line and also eliminate the necessity of the use of swivels, weights, corks, bobs or the like.

From the foregoing, it is thought that the construction and the manner of use of the artificial bait or minnow will be clearly understood, and therefore a more extended explanation has been omitted.

What is claimed is:

1. An artificial bait or minnow of the character described, comprising a plurality of flat sections cut to simulate a live minnow, split resilient rings loosely connecting the sections and which are adapted for the detachable connection of hooks therewith.

2. An artificial bait including a body comprising a plurality of sections, means pivotally connecting the sections and hooks detachably connected with the connecting means.

3. An artificial bait or minnow of the character described, comprising a pair of flat sections jointly simulating a minnow, split rings connecting the sections together, and hooks detachably mounted on the rings at opposite sides of the sections.

4. An artificial bait comprising a body portion including a plurality of flat sections having their mutually adjacent ends perforated, rings engaged through said perforations and connecting the sections and extending beyond their side faces, and hooks connected with the extending portions of the rings.

5. In an artificial bait the combination with a sectional body and a plurality of hooks, of a common means pivotally connecting the body sections together and connecting the hooks therewith.

In testimony whereof, I affix my signature, in the presence of two witnesses.

HERSCHEL ROBINSON.

Witnesses:
 DAN FOOT,
 W. L. WILLIAMS.